UNITED STATES PATENT OFFICE.

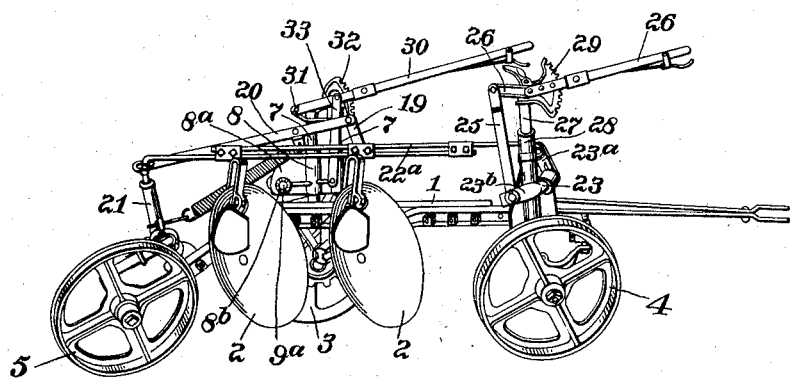
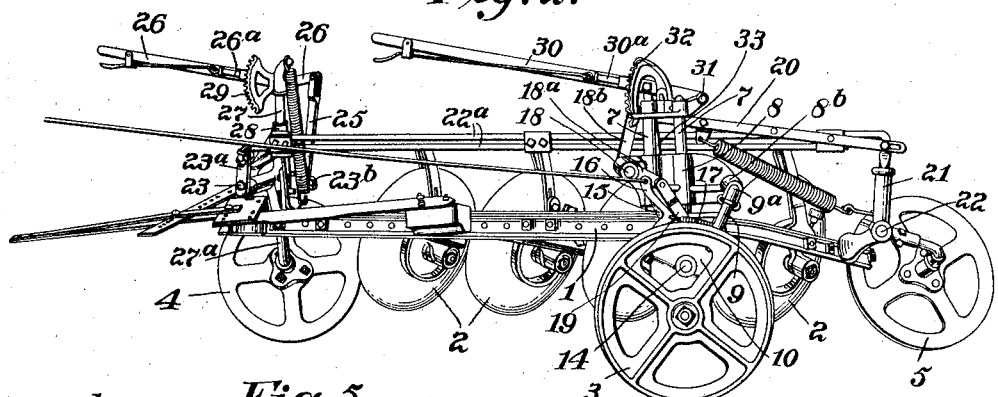
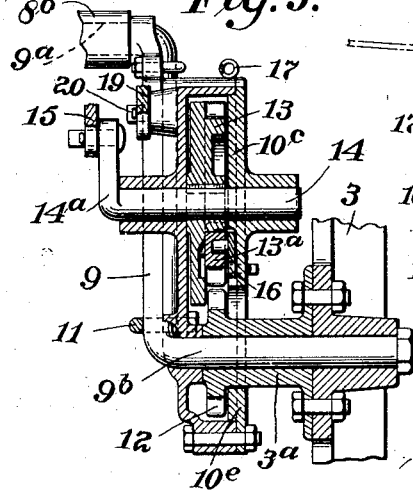
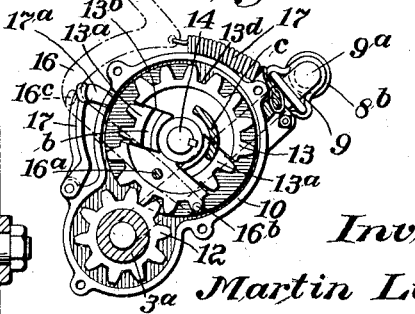

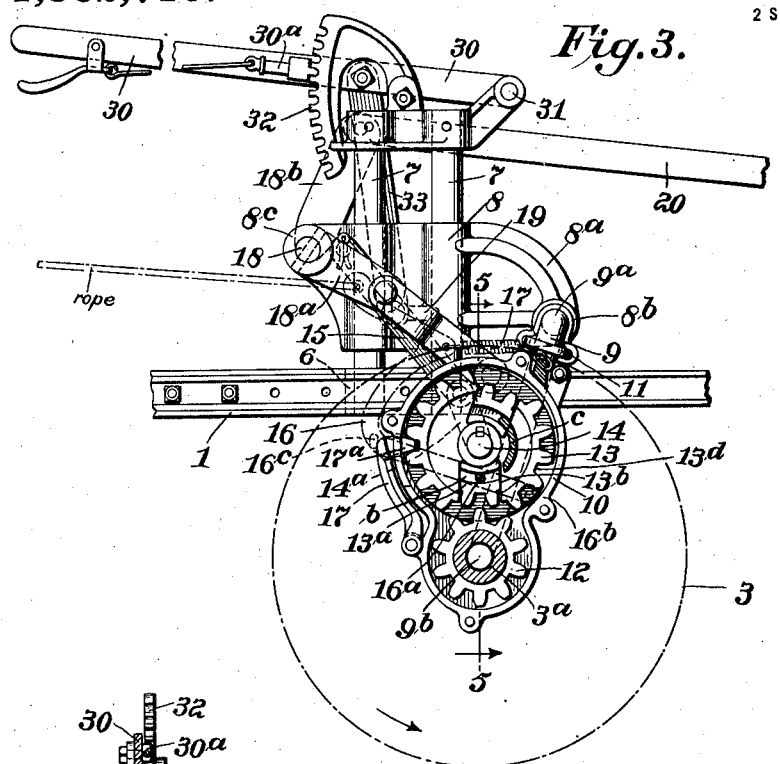
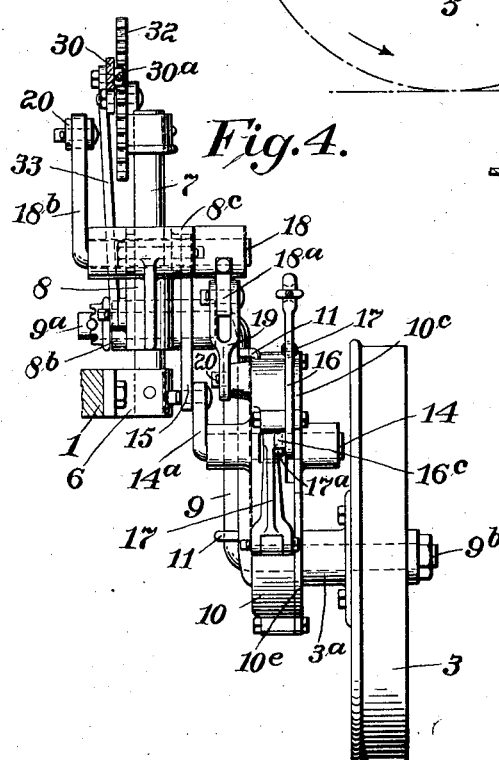
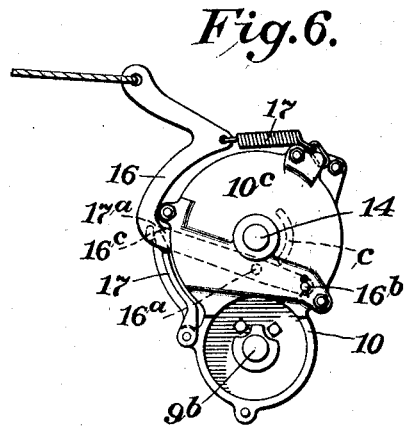

MARTIN LUNDIN, OF CHATTANOOGA, TENNESSEE, ASSIGNOR TO NEWELL SANDERS PLOW COMPANY, OF CHATTANOOGA, TENNESSEE, A CORPORATION OF TENNESSEE.

WHEEL-PLOW.

1,362,710.

Specification of Letters Patent.

Patented Dec. 21, 1920.

Application filed January 15, 1920. Serial No. 351,648.

*To all whom it may concern:*

Be it known that I, MARTIN LUNDIN, a citizen of the United States, resident of Chattanooga, Tennessee, have invented certain new and useful Improvements in Wheel-Plows, of which the following is a specification.

My present invention relates to improvements in wheel plows and includes among its objects the provision of simple, economical, efficient and durable power operated means for lifting the disks from and lowering them into the ground.

The invention aims further to provide a power lift which will raise all disks clear of the ground and which will operate on all three wheels, which will be positive in operation in either direction, and which will be securely locked in its extreme positions.

The invention also aims to provide operating parts which will be out of operation or non-moving except when the lift is being actuated, and which operating parts are so constructed and arranged as to be free from danger of entanglement with weeds and stalks.

With these and other objects in view, the invention includes the novel features of construction and arrangement and combination of parts hereinafter described and particularly defined by the appended claims.

An embodiment of my invention is illustrated in the accompanying drawing, in which—

Figure 1 is a side elevation of my improved plow.

Fig. 2 is a similar view of the opposite side.

Fig. 3 is an enlarged elevation of the power lift mechanism associated with the land wheel, which latter is indicated by a dotted circle only, to prevent obscuring of the adjacent parts.

Fig. 4 is a detail elevation of the land wheel and associated power lift parts.

Fig. 5 is a transverse section on line 5—5 of Fig. 3.

Fig. 6 is a detail face view of the gear case with the lower gear cover section removed, and, Fig. 7 is a detail view showing the gears partially rotated from the position shown in Fig. 3.

Referring by reference characters to these drawings, the numeral 1 designates the plow frame to which the furrow openers 2, herein shown as disks, are secured in the usual or any desired manner. This frame is supported and carried upon three wheels,—a land wheel 3, a front furrow wheel 4, and a rear furrow wheel 5. The land wheel is, in the present instance, utilized as the source of power to effect the lifting and lowering operations, and to this end it is connected with the frame in the manner and by the means which will now be described.

Secured to the frame in any suitable manner, as by clip or bracket 6, is an upright guide preferably in the shape of a pair of upright posts 7 on which are slidably mounted a bracket or socket member 8 which has a bracket extension $8^a$ provided with a transverse cylindrical bearing $8^b$ in which is journaled the horizontal portion $9^a$ of the cranked axle 9, the other horizontal portion $9^b$ constituting the stub axle of the land wheel 3. The intermediate portion of the cranked axle lies in a substantially vertically plane and to this portion is secured a gear case 10, preferably by means of U-shaped clips 11, which gear case is shaped to receive a pair of gears 12 and 13.

The gear 12 is fast on a hub $3^a$ bolted or otherwise suitably secured to the land wheel. The gear 13 is fast on a shaft 14, journaled in a bearing carried by the gear case, and shaft 14 has a crank arm $14^a$ which is connected by a link 15 with the member 8. When, therefore, gear 13 is rotated by gear 12 driven by land wheel 1, the corresponding movement of crank arm $14^a$ acting through link 15 on the relatively stationary member 8, will cause the gear case and rigidly connected crank axle to swing on portion $8^b$ as an axis, with the result that the frame of the plow will be raised or lowered according to the relative position of the parts at the commencement of the movement.

In order that the land wheel may normally run free the gear wheel 13 is mutilated, or is provided with two interruptions in its teeth, which are completed by two gear segments $13^a$ which are mounted to be radially slidable in grooves $13^b$ in the gear body and which when moved out complete the gear wheel. These are provided with arc-shaped grooves *b* designed to be engaged in the proper sequence by an arc-shaped rib or guide *c* carried by the gear case cover section 10ᶜ, and a pin or projection 16ᵃ on the operating or jerk lever 16, which is pivoted at 16ᵇ to the inner face of the gear case cover and works in a slot in the edge of the gear case, the guide being designed to hold the gear segments out of operating position after they have left the pin. The lever is normally held raised by a spring 17 and in this position the pin 16ᵃ in the groove of the lower gear segment (Fig. 3) holds this segment out of engagement with the gear 12, whereby the land wheel is free to rotate without affecting gear 13. During this period the gear 13 is prevented from rotating by a locking dog 17ᵃ carried by an arm 17 pivoted to the side of the case, said dog projecting through an opening in the edge of the case and being designed to engage with either of two locking recesses 13ᵈ formed in opposite sides of a circular disk portion of the gear member offset from the plane of the gear teeth. The dog is held in locking position by a projection 16ᶜ which bears against the rear side of the arm 17. While the mutilated gear 13 is so held against movement the crank shaft 14 and crank arm 14ᵃ will be likewise held against movement and the gear case and crank axle 9 will be held stationary.

A pull rope or like device leads from lever 16 into position convenient to the operator and when by this means lever 16 is swung forward or toward the left, Figs. 3 and 6, the pin or projection in the groove of the lower gear segment causes the latter to be moved down until its teeth mesh with the gear 12, the teeth of the gear segment forming a continuation of, or completing the teeth of gear 13. The rotation of the land wheel and gear 12 in the direction of the arrow, Fig. 3, due to the movement of the plow toward the left, causes the gear case and crank shaft to be swung about portion 9ᵃ as a center or axis, and, as the plow disks in this position (Fig. 3) would be elevated, the result would be that they would be lowered into the ground.

It will be understood that as lever 16 is moved as above indicated the dog 17ᵃ is likewise released and forced out of the locking recess by the bevel of the teeth when the gear rotates.

Having started the operation of the power mechanism the operator releases the cord whereupon lever 16 is drawn back by spring 17 and a dog 17ᵃ is pressed against the disk portion of gear 13 ready to engage the opposite locking recess as soon as this comes into alinement, whereupon the plow is locked in its lowered position. Another pull upon the lever will then repeat the operation which will result in the raising of the frame and plow disks or furrow openers and the locking of the same in the elevated or highest position.

It will be understood that as soon as a gear segment is brought to a position above shaft 14 it will drop down toward the shaft into position to engage the arc shaped rib on the gear case cover as indicated in Fig. 3, which, as the gear again rotates, will hold said gear segment in position to have its groove engaged by the pin on the lever 16.

In order that the raising and lowering motion may be transmitted to the furrow wheels and thus the plow frame and furrow openers raised and lowered without tilting, I provide the following instrumentalities:—

A rock shaft 18 is journaled in a suitable bearing 8ᶜ carried by the member 8 and has an arm 18ᵃ fast thereon which is connected by a link 19 with a pivot pin 20 fast on the gear case. The shaft 18 also carries a rigidly attached arm 18ᵇ which is connected by a link or bar 20 with the upwardly extending arm 21 which forms a part of the cranked axle on which the rear furrow wheel 5 is journaled, this cranked axle member pivoting about the bearing stud 22 carried by the frame.

Arm 21 is also connected by an adjustable rod or bar 22ᵃ with an arm 23ᵃ fast on a shaft 23 journaled in a bearing carried by the front end of the plow frame, which shaft has another arm 23ᵇ connected by a link 25 with one end of a lever 26 fulcrumed on the upper end of a post 27 which is vertically slidable in the vertical socket member 28 of the frame. The post 27 carries at its lower end the stub axle 27ᵃ on which the front furrow wheel 4 is journaled and the lever is normally held against movement by a dog 26ᵃ which engages the teeth of a quadrant 29. By releasing the dog and operating lever 26 by hand the front end of the plow frame may be raised or lowered by hand to secure any desired adjustment.

When, however, the dog is in engagement with the quadrant and the lever held against movement the swinging of the gear case in the manner described by the power lift will, through link 20, swing the rear post 21 and through link 22ᵃ and the lever arms 23ᵃ, 23ᵇ, and link 25, cause post 27 to be moved vertically in its bearing socket.

Hand operated means are also provided in connection with the land wheel mechanism for securing vertical movement independently of the power lift. This comprises a lever 30 fulcrumed at 31 on a bracket arm carried at the upper end of the posts 7 and having a dog 30ᵃ adapted to coact with the teeth of a quadrant 32 also rigidly carried at the upper end of said posts. The lever 30 is connected by a link 33 with the member 8. The gear 12 may be protected by a removable cover section 10ᵉ.

Having thus described my invention, what I claim is:

1. In a wheel plow, a frame member, a post member rigidly connected therewith, a slide member vertically movable on said post member, a gear case pivotally connected with said slide member, a stub axle member rigidly held by said gear case, a supporting wheel journaled on said stub axle, a gear fast thereon, a crank shaft journaled in the gear case, a link connecting said crank axle with a fixed pivot on said slide, and means controllable by the operator for causing said gear on the supporting wheel to operate said crank shaft.

2. In a wheel plow, a frame member, a gear case pivotally connected with a part supported by said frame member, a stub axle rigidly carried by said gear case, a supporting wheel journaled on said stub axle and having a gear fast on the hub thereof, a crank shaft journaled in said gear case, a link connecting said crank shaft with a part supported by the frame member, a gear on said crank shaft, and means controllable by the operator for causing said gears to intermesh for a predetermined period of time.

3. In a wheel plow, a frame member, a gear case pivotally connected to a part supported by said frame member, a stub axle rigidly carried by said gear case, a supporting wheel journaled on said stub axle having a gear fast on the hub thereof, a crank shaft journaled in said gear case, a link connecting the crank of said shaft with said part supported by the frame member, a gear fast on said crank shaft having a radially movable segment normally disengaged from the gear on the supporting wheel, and means for moving said segment outward.

4. In a wheel plow, a gear case pivotally connected to a plow supporting part, a stub axle rigidly carried by said gear case, a supporting wheel journaled on said stub axle, a gear fast on the hub of said supporting wheel, a crank shaft journaled in the gear case, a link connecting the crank of said shaft with said plow supporting part, a mutilated gear fast on said crank shaft having a cut away portion normally out of mesh with the gear on the supporting wheel, a radially movable segment adapted to complete the periphery of said mutilated gear, means for operating said segment to cause it to engage the teeth of the gear on the supporting wheel, and releasable means for locking said mutilated gear normally against movement.

5. In a wheel plow, a gear case pivotally connected to a plow supporting part, a stub axle rigidly carried by said gear case, a supporting wheel journaled on said stub axle, a driving gear fast on said supporting wheel, a crank shaft journaled in the gear case, a link connecting said crank shaft with said plow supporting part, a mutilated gear fast on said crank shaft having spaced mutilated portions designed when juxtaposed to said driving gear to permit free rotation of the latter, radially movable gear segments held normally retracted and designed, when in juxtaposition to said driving gear to be moved outward to engage the same, releasable means for holding said mutilated gear locked with one or the other of said gear segments in juxtaposition to said driving gear, and means for moving said juxtaposed segment.

6. In a wheel plow, a gear case pivotally connected to a plow supporting part, a stub axle rigidly carried by said gear case, a supporting wheel journaled on said stub axle, a driving gear fast on said supporting wheel, a crank shaft journaled in the gear case, a link connecting said crank shaft with said plow supporting part, a mutilated gear fast on said crank shaft having spaced mutilated portions designed when juxtaposed to said driving gear to permit free rotation with the latter, radially movable gear segments held normally retracted and designed, when in juxtaposition to said driving gear to be moved outward to engage the same, releasable means for holding said mutilated gear locked with one or the other of said gear segments in juxtaposition to said driving gear, and means for moving said juxtaposed segments, and means for causing said releasable locking means to be operated in unison with said gear segment.

7. In a wheel plow, a plow supporting part, a gear case pivotally connected thereto, a stub axle part rigidly carried by said gear case, a supporting wheel journaled on said stub axle, a driving gear fast on said supporting wheel, a crank shaft journaled in said gear case, a link connecting said crank shaft with said plow supporting part, a mutilated gear fast on said crank shaft designed to mesh with said driving gear, said mutilated gear having a pair of spaced mutilated portions, radially movable gear segments in said mutilated portions normally held retracted, a disk member carried by said mutilated gear having a pair of locking recesses, a dog pivotally supported by the gear case adapted to alternately engage said locking recesses to hold said mutilated gear with one or the other of said gear segments juxtaposed to said driving gear, a lever pivoted to the gear case having means to move said juxtaposed gear segment into engagement with the driving gear, and means whereby the movement of said lever simultaneously unlocks said locking dog.

8. In a wheel plow, a plow supporting part, a gear case pivotally connected thereto, a stub axle part rigidly carried by said gear case, a supporting wheel journaled on said stub axle, a driving gear fast on said supporting wheel, a crank shaft journaled in said gear case, a link connecting said crank shaft with said plow supporting part, a mutilated gear fast on said crank shaft designed to mesh with said driving gear, said mutilated gear having a pair of spaced mutilated portions, radially movable gear segments in said mutilated portions normally held retracted, a disk member carried by said mutilated gear having a pair of locking recesses, a dog pivotally supported by the gear case adapted to alternately engage said locking recesses to hold said mutilated gear with one or the other of said gear segments juxtaposed to said driving gear, said gear segments having face grooves concentric with the axis of the mutilated gear, a lever having a portion pivoted within the case provided with a projection adapted to engage said grooves when the segments are juxtaposed to said driving gear, means for operating said lever, and means for simultaneously operating said locking dog.

9. In a wheel plow, a plow supporting part, a gear case pivotally connected thereto, a stub axle part rigidly carried by said gear case, a supporting wheel journaled on said stub axle, a driving gear fast on said supporting wheel, a crank shaft journaled in said gear case, a link connecting said crank shaft with said plow supporting part, a mutilated gear fast on said crank shaft designed to mesh with said driving gear, said mutilated gear having a pair of spaced mutilated portions, radially movable gear segments in said mutilated portions normally held retracted, a disk member carried by said mutilated gear having a pair of locking recesses, a dog pivotally supported by the gear case adapted to alternately engage said locking recesses to hold said mutilated gear with one or the other of said gear segments juxtaposed to said driving gear, said gear segments having face grooves concentric with the axis of the mutilated gear, a pivoted lever having a projection adapted to engage the groove of each gear segment when juxtaposed to said driving gear, a fixed guide carried by the gear case adapted to engage said grooves to insure alinement with said projection, and means for causing said dog and lever to operate in unison.

10. In a wheel plow, a frame having a vertical part, a bracket member slidably guided on said post, means for locking said bracket member in any desired position thereon, a cranked axle member having a part disposed in a horizontal plane and journaled in one end of said bracket, said axle member having an intermediate part disposed in a vertical plane carrying at its extremity a stub axle, a supporting wheel journaled on said stub axle, a gear case rigidly secured to said intermediate part, a driving gear fast on said supporting wheel, a crank shaft journaled in said gear case, a link connecting said crank shaft with a part of said bracket member spaced from said crank axle bearing, a driven gear fast on said crank shaft, releasable means for holding said crank shaft against movement, and means for operatively engaging said driving and driven gears and simultaneously releasing said holding means.

In testimony whereof I affix my signature.

MARTIN LUNDIN.